United States Patent
Kalkkuhl et al.

(10) Patent No.: US 12,510,362 B2
(45) Date of Patent: Dec. 30, 2025

(54) METHOD FOR DETECTING MALFUNCTIONS IN INERTIAL MEASUREMENT UNITS

(71) Applicants: Mercedes-Benz Group AG, Stuttgart (DE); Robert Bosch GmbH, Stuttgart (DE)

(72) Inventors: Jens Kalkkuhl, Holzgerlingen (DE); Mustafa Ajanovic, Sindelfingen (DE); Philipp Alfons Digeser, Stuttgart (DE)

(73) Assignees: Mercedes-Benz Group AG, Stuttgart (DE); Robert Bosch GmbH, Stuttgart (DE)

( * ) Notice: Subject to any disclaimer, the term of this patent is extended or adjusted under 35 U.S.C. 154(b) by 345 days.

(21) Appl. No.: 18/254,900

(22) PCT Filed: Nov. 26, 2021

(86) PCT No.: PCT/EP2021/083161
§ 371 (c)(1),
(2) Date: May 30, 2023

(87) PCT Pub. No.: WO2022/112500
PCT Pub. Date: Jun. 2, 2022

(65) Prior Publication Data
US 2024/0003689 A1    Jan. 4, 2024

(30) Foreign Application Priority Data
Nov. 30, 2020   (DE) .................... 10 2020 131 669.0

(51) Int. Cl.
*G01C 21/16*    (2006.01)
*G01C 25/00*    (2006.01)

(52) U.S. Cl.
CPC ......... *G01C 21/188* (2020.08); *G01C 25/005* (2013.01)

(58) Field of Classification Search
None
See application file for complete search history.

(56) References Cited

U.S. PATENT DOCUMENTS 5,184,304 A * 2/1993 Huddle ............... G01C 21/188
  33/321
8,065,074 B1  11/2011 Liccardo
(Continued)

FOREIGN PATENT DOCUMENTS

CN    105550053 B    8/2018
DE     3634023 A1    4/1988
(Continued)

OTHER PUBLICATIONS

European Patent Office, International Search Report and Written Opinion in Application No. PCT/EP2021/083161, dated Mar. 3, 2022, 26 pages, Rijswijk, Netherlands.
(Continued)

*Primary Examiner* — Lisa M Caputo
*Assistant Examiner* — Cynthia L Davis
(74) *Attorney, Agent, or Firm* — Marshall & Melhorn, LLC (57) ABSTRACT

A method for detecting malfunctions in inertial measurement units which are used in a vehicle to measure angular velocities and specific forces may have at least three inertial measurement units. Each inertial measurement unit may have a plurality of sensors, such as accelerometer and gyroscopic sensors. A first inertial measurement unit is used as a master inertial measurement unit. A second inertial measurement unit and a third inertial measurement unit, the capabilities of which can be lower than those of the first inertial measurement unit, are used as slave inertial measurement units. Measurements of the master inertial measurement unit are used as reference values to compensate measurements of the slave inertial measurement unit regard-
(Continued)

ing estimation of error model parameters with respect to the master inertial measurement unit to detect a malfunction in one of the three sensor signals.

10 Claims, 5 Drawing Sheets

(56) References Cited

U.S. PATENT DOCUMENTS

| | | | |
|---|---|---|---|
| 8,825,436 B2 | 9/2014 | Zhang et al. | |
| 9,568,321 B2 | 2/2017 | Bharadwaj et al. | |
| 9,645,250 B2 | 5/2017 | Zeng et al. | |
| 9,753,144 B1 | 9/2017 | Jafari et al. | |
| 2007/0265810 A1* | 11/2007 | Martin | G01C 21/165 702/191 |
| 2009/0030608 A1* | 1/2009 | Soehren | G01C 21/165 701/510 |
| 2011/0172950 A1* | 7/2011 | Brady | G01C 21/188 702/141 |
| 2011/0257927 A1* | 10/2011 | Bharadwaj | G01C 25/005 702/150 |
| 2018/0001994 A1 | 1/2018 | Morrison | |
| 2018/0081426 A1* | 3/2018 | Rothkopf | G06F 3/012 |
| 2020/0088521 A1* | 3/2020 | Glevarec | G01C 21/188 |
| 2022/0178699 A1* | 6/2022 | Coatantiec | G01C 25/00 |

FOREIGN PATENT DOCUMENTS

| | | | |
|---|---|---|---|
| DE | 4403190 C1 | | 7/1995 |
| EP | 3006901 A1 | | 4/2016 |
| JP | 2017156943 A | * | 9/2017 |
| JP | 2020170074 A | | 10/2020 |
| WO | 2019216075 A1 | | 11/2019 |

OTHER PUBLICATIONS

German Patent and Trade Mark Office, Office Action in Application No. DE102020131669.0, dated Jun. 16, 2021, 5 pages.
L. Beibei et al., "An indoor location algorithm based on Kalman filter fusion of ultra-wide band and inertial measurement unit", AIP Advances, American Institute of Physics, 2 Huntington Quadrangle, Melville, NY 11747, vol. 9, No. 8, Aug. 13, 2019, 21 pages.
A. Kohn et al., "Fail-operational in safety-related automotive multi-core systems", 10th IEEE International Symposium on Industrial Embedded Systems (SIES), 2015, 4 pages.
T. Ishigooka et al., "Cost-Effective Redundancy Approach for Fail-Operational Autonomous Driving System", 2018 IEEE 21st International Symposium on Real-Time Distributed Computing (ISORC), 2018, pp. 107-115.
M. Li et al., "Fail-Operational Steer-By-Wire System for Autonomous Vehicles", 2019 IEEE International Conference on Vehicular Electronics and Safety (ICVES), 2019, 6 pages.
T. Schmid et al., "A Safety Argumentation for Fail-Operational Automotive Systems in Compliance with ISO 26262", 2019 4th International Conference on System Reliability and Safety (ICSRS), 2019, pp. 484-493.
M. Sheffels, "A Fault-Tolerant Air Data/Inertial Reference Unit", IEEE AES Systems Magazine, Mar. 1993, 5 pages.
M. McIntyre et al., "The Boeing 777 Fault Tolerant Air Data Inertial Reference System—A New Venture in Working Together", 1995 IEEE, pp. 178-183.
P. Groves, "Principles of GNSS, Inertial and Multisensor Integrated Navigation Systems", Artech House, Boston, London 2013, pp. 701-702.
W. Klier et al., "Robust Estimation of Vehicle Sideslip Angle—an Approach w/o Vehicle and Tire Models", SAE Technical Paper Series, No. 2008-01-0582, Apr. 14-17, 2008, 7 pages.
A. Reim et al., "Central Sideslip Angle Estimation on a Software Integration Platform", 2009 SAE International, No. 2009-01-0430, 5 pages.
http://www.aceinna.com, "Triple redundant IMU targets autonomous vehicles", Sep. 4, 2019.
J. Wendel, Integrierte Navigationssysteme [Integrated Navigation Systems], Oldenbourg Wissenschaftsverlag 2007, pp. 27-35 and 83-99.
Japanese Patent Office, Office Action in Application No. JP 2023-532310, dated Jan. 7, 2025, 7 pages.
Denis Berdjag et al., Fault Detection and Isolation of Aircraft Air Data/Inertial System, 4th European Conference for Aerospace Sciences, Copyright 2011.
Huamin Jia, Data Fusion Methodologies for Multisensor Aircraft Navigation Systems, Cranfield University, Cranfield College of Aeronautics, PhD Thesis, Apr. 2004.
Korean Intellectual Property Office, Office Action in Application No. KR 10-2023-7021922, dated May 22, 2025, 13 pages.

* cited by examiner

METHOD FOR DETECTING MALFUNCTIONS IN INERTIAL MEASUREMENT UNITS

The invention concerns a method for detecting malfunctions in inertial measurement units according to the claims.

BACKGROUND FOR THE INVENTION

Inertial Measurement Units (IMU) are arrangements of accelerometers and gyroscopes, used to measure specific forces (accelerations) and rotation speeds of bodies in space. As the designation for the accelerometer signal, German navigation literature has also established the term Specific forces and the symbol f (see literature citation 2). For gyroscope signals, the symbol $\omega$ is used herein. The term Inertial Measurement Unit is hereinafter represented by the abbreviation IMU. Inertial measurement units are used to determine the location, position, and speed of vehicles, in particular also during 20 automated operation. Examples of this type of use for IMUs can be found in literature citations (3) to (6), or also in U.S. Pat. No. 9,753,144 B1 (DE 10 2017 102 269 A1).

Figure 1:
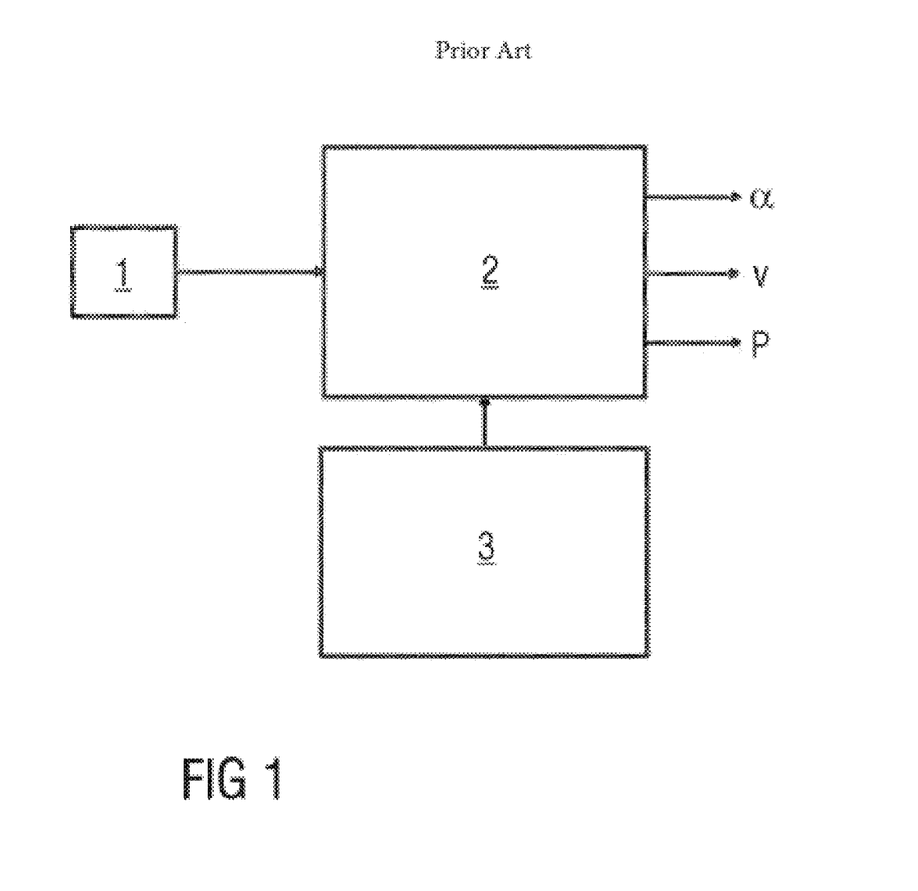
FIG. 1 a schematic view of a typical example of using an inertial measurement unit (IMU) to estimate the movement values of a vehicle, FIG. 2 a schematic view of a monitoring system according to the invention, in combination with a movement value estimation, FIG. 3 a schematic view of a preliminary data processing operation (pre-compensation) for rotation speed sensors, FIG. 4 a schematic view of a preliminary data processing operation (pre-compensation) for accelerometers, and FIG. 5 a schematic view of an error detection logic and a decision-making logic.

FIG. 1 shows an example of using an inertial measurement unit 1 for state-of-the-art motion sensing and navigation. The inertial measurement unit 1 sends rotation speed signals from the gyroscopes and specific force signals from the accelerometers. In a sensor fusion unit 2, by integrating these values, motion values such as orientation angle $\alpha$, velocity v, and/or position P are calculated and are then corrected through the use of additional sensors 3, such as an odometer, magnetometer, barometric altimeter, and/or GNSS receiver. The current state of the art uses a Kalman filter for sensor fusion.

Inertial measurement units are available in a variety of quality levels. Their quality and price are determined primarily by the sensor technology used. For serial application in automobiles, cost-effective sensors based on MEMS (micro-electromechanical sensors) technology are most commonly used. However, the accuracy of this type of cost-effective IMU sensors is limited by stochastic sensor noise and system errors such as bias, sensitivity errors, non-linearity, and misalignment. Such errors are characteristics that affect sensors in normal operation. Systematic errors must be detected and compensated through suitable methods, in order to ensure high accuracy of the calculated motion values. Examples of compensation methods can be found in the technical literature or also in DE 10 2017 102 269 A1. The stochastic and systematic errors of an IMU sensor are described using a model. For example, the value $f_{im}$ of a specific force measured by the sensor is described through the model $$f_{im} = (1+s_{fi}) \cdot c_i^T \vec{f}_i + b_{fi}(t) + v_i \quad (1)$$

wherein $\vec{f}_i$ is the vector of the applicable specific force components at the measurement location. The value $b_{fi}(t)$ describes a bias that is constant or changes gradually over time, the value $s_{fi}$ is the sensor's sensitivity error, the value $v_i$ designates sensor noise, and the vector $c_i^T$ describes the alignment of the sensor axis in the reference coordinate system. The model parameters are determined using estimation methods.

In addition to stochastic and systematic errors, IMU sensors can also have malfunctions. In this case, the sensor loses the specified (and therefore preset by design) association between the physical measured values and the emitted sensor signal, so that a non-specified measurement procedure occurs. This renders the affected IMU sensor unusable.

Sensor malfunctions that propagate undetected during movement calculation or navigation can lead to significant errors or grossly false values in the operating signals and thus represent a safety risk in safety-related applications.

For safety-critical applications such as automated driving, sensor malfunctions must be detected. The relevant error must then be eliminated from the navigation solution, and a backup solution must be triggered in order to guarantee that the system remains fully functional (error-tolerant system).

Figure 2:
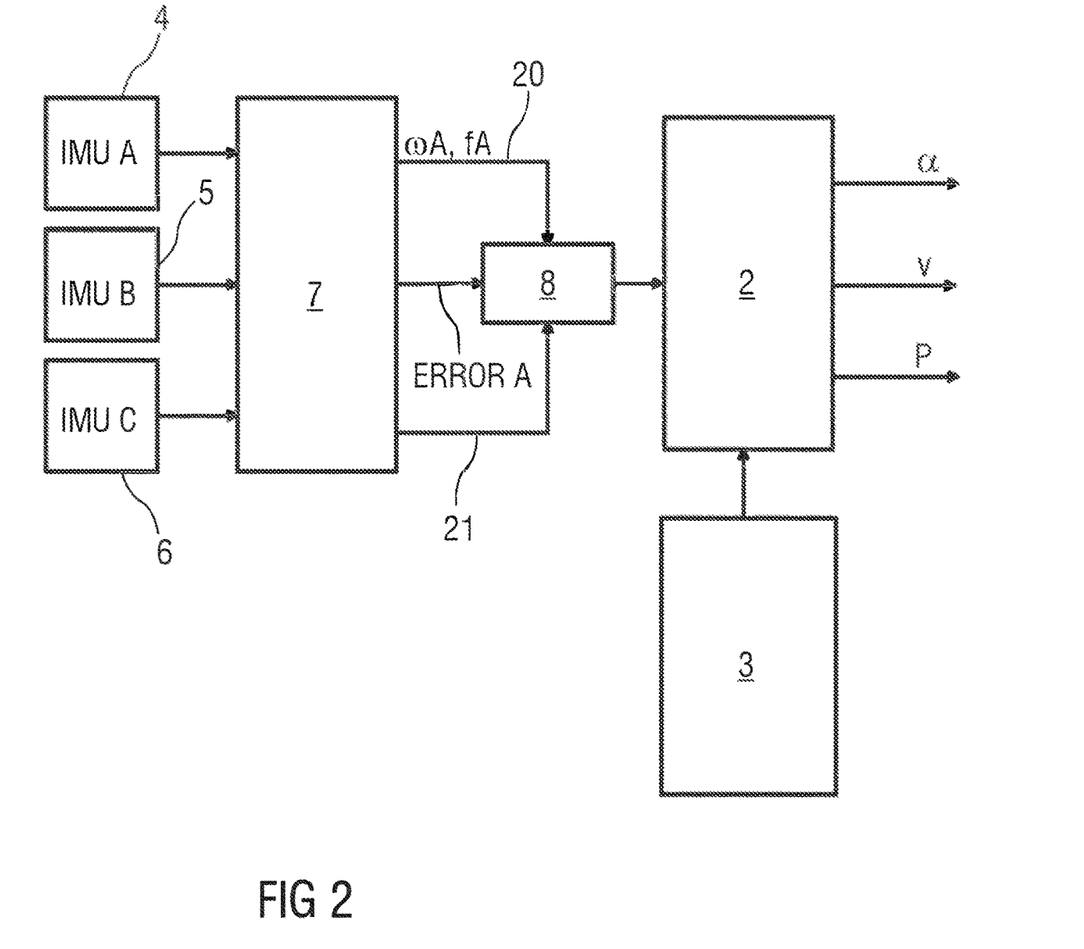

This applies especially to sensor malfunctions in the inertial measurement unit. The proposed solution for this according to the invention is shown in FIG. 2:

Other solutions based on the prior art are discussed below.

PRIOR ART

U.S. Pat. No. 9,568,321 B2 describes the detection of malfunctions in an individual IMU without redundancy. It proposes integrating detection in the form of Health Monitoring Blocks into a doubly-redundant navigation system (Inertial Navigation System—INS). In the Health Monitoring Block, the estimation errors appearing during motion estimation are assessed. This solution has the disadvantage that the effects of sensor malfunctions on a navigation system do not allow direct conclusions about the defective sensor element. In addition, the IMU signal integration used in the INS leads to long error detection times. Furthermore, error detection is based on the use of additional sensors such as GNSS, magnetometer, barometer, and odometer. These sensors generally have higher error susceptibility and lower accuracy than the IMU sensors. In the arrangement described above, malfunctions of these additional sensors cannot be clearly differentiated from IMU malfunctions. In summary, it can be seen that the described process does allow detection of a malfunction but not identification of the defective sensor. However, this is an essential requirement for error-tolerant system methods.

The disadvantages of the above-described process have been known for a long time. More details are available, for example, in (3), Chapter 17. It explicitly stipulates the need for redundant hardware in safety-critical INS applications.

The use of redundant inertial measurement units (IMUs) is state-of-the-art in aircraft technology. It involves incorporating high-quality inertial measurement units with identical characteristics into a redundant sensor configuration.

In this regard, for example, the prior art uses an Air Data Inertial Reference Unit (ADIRU), in which six accelerometers and six rotation speed sensors are arranged in a non-orthogonal pattern, achieving maximum redundancy with a minimal number of sensors (see literature citations 1, 2).

Here, for example, for the six specific force signals from the accelerometers $f_1, \ldots, f_6$, a regression equation is solved in order to get a resulting vector for the orthogonal components $[f_x, f_y, f_z]$ of the specific force:

$$\begin{bmatrix} f_1 \\ \vdots \\ f_6 \end{bmatrix} = M \cdot \begin{bmatrix} f_x \\ f_y \\ f_z \end{bmatrix} + v \quad (2)$$

where M is a matrix that describes the sensor geometry, and v is a vector of the sensor noise.

Monitoring and average generation can occur in parallel, while the regression equation is being solved. Up to two accelerometers in the system can fail without impairing its function. For functional safety, at least four sensors must be available.

Another solution with two INSs, whose respective inertial measurement units are rotated 60° to each other, is proposed in U.S. Pat. No. 5,184,304 A. In this solution, the error statistics emitted by each system are evaluated by the other, which identifies the defective sensor.

Sensors qualified for air travel, especially in non-orthogonal arrangements, require a great amount of installation space and are therefore poorly suited for automotive use.

In automotive applications, which are much more cost-sensitive, the use of this type of redundant, high-quality inertial sensors is also not feasible from a financial standpoint.

A description of the use of MEMS sensors in a multiple-redundancy arrangement can be found in U.S. Pat. No. 8,825,436 B2. Here the multiple arrangement is used exclusively to reduce measurement noise and systematic sensor errors (run-to-run bias and temperature-dependent bias). It does not include a strategy for detecting and eliminating sensor malfunctions.

(6) describes an inertial measurement unit for automotive use with triple redundancy. However, it has the disadvantage that it is built into a structural element and is therefore not adequately protected against power supply problems and common-cause errors.

Also known from the literature (see literature citation 2) are master-slave arrangements for inertial measurement units or navigation systems. The basic idea for this is to estimate parameters from the slave system, such as alignment angle, offset, etc., based on navigation data from the master system using a Kalman filter. The corresponding process is known as transfer alignment. This method is commonly used in weapons systems, which contain low-cost navigation systems, while a guidance system or carrier contains a high-quality navigation system.

In
Kohn et al.: "Fail-operational in safety-related automotive multi-core systems", 10th IEEE International Symposium on Industrial Embedded Systems (SIES), 2015, pp. 1-4,
T. Ishigooka, S. Honda and H. Takada: "Cost-Effective Redundancy Approach for Fail Operational Autonomous Driving System", 2018 IEEE 21st International Symposium on Real-Time Distributed Computing (ISORC), 2018, pp. 107-115,
M. Li and L. Eckstein: "Fail-Operational Steer-By-Wire System for Autonomous Vehicles", 2019 IEEE International Conference on Vehicular Electronics and Safety (ICVES), 2019, pp. 1-6, and
T. Schmid et al.: "A Safety Argumentation for Fail-Operational Automotive Systems in Compliance with ISO 26262", 2019 4th International Conference on System Reliability and Safety (ICSRS), 2019, pp. 484-493
various concepts for error tolerance in redundant inertial measurement units are described.

SUMMARY

The intent of the invention is to provide an improved method for detecting malfunctions in inertial measurement units (IMUs) that are being used on a vehicle to measure angular velocities and forces or accelerations.

This objective is achieved by the invention using a method with the characteristics in the claims.

Advantageous embodiments of the invention are the object of the subordinate claims.

A method according to the invention, for detecting malfunctions in inertial measurement units that are being used on a vehicle to measure angular velocities and specific forces, involves at least three inertial measurement units, each with multiple sensors, including accelerometers and gyroscopic sensors. According to the invention, a first inertial measurement unit is used as the master inertial measurement unit, and a second inertial measurement unit and a third inertial measurement unit, whose performance reliability can be lower than that of the first inertial measurement unit, are used as slave inertial measurement units, wherein measurements from the master inertial measurement unit are used as reference values in order to compensate for measurements from the slave inertial measurement units via estimation of error model parameters (as in citation (1), for example) and compared to the master inertial measurement unit, so that, based on the respective three corresponding sensor signals and using 2-out-of-3 voting, a malfunction can be detected in one of the three sensor signals, wherein the one of the three inertial measurement units whose sensor signal has a distance from the median for the three sensor signals that exceeds a threshold value is identified as defective, and a malfunction of the master inertial measurement unit causes the signals to be switched to one of the still-functional slave inertial measurement units, applying previously calculated pre-compensation.

This process can generally also be expanded to involve a majority decision on more than three inertial measurement units.

In one embodiment of the invention, the error model parameters can be estimated using a Kalman filter or a recursive least squares method.

In one embodiment of the invention, for estimation of the error model parameters, error models can be used that involve all model parameters from the slave inertial measurement units, wherein at least temporally different relative sensor offsets from the master inertial measurement unit are estimated online.

In one embodiment of the invention, specific forces from the master inertial measurement unit can be translated to the measurement locations of the slave inertial measurement units.

In one embodiment of the invention, the estimated parameters can be limited to permissible maximum values.

In one embodiment of the invention, co-variances of estimation errors evaluated in the Kalman filters can be used in assessing sensor signal deviations when detecting the significance of signal deviations.

In one embodiment of the invention, all sensors in all inertial measurement units can be filtered and time-synchronized using respective filter units.

In one embodiment of the invention, online-estimated error model parameters can be time-delayed and used on the measurement values of the slave inertial measurement units.

In one embodiment of the invention, the slave inertial measurement units can be pre-compensated using a master-slave configuration, wherein time delays are applied to estimated sensor outputs, wherein if an error is detected in the first inertial measurement unit within the time delay, the estimated sensor errors in the slave inertial measurement units are frozen at the values for the end of the time delay.

In one embodiment of the invention, detection logic is applied to the signals from the first inertial measurement unit and the pre-compensated signals from the slave inertial measurement units, in order to detect the signal that deviates the most from the average or median of the three signals, wherein if a normalized signal difference from the average or median exceeds the value 1, a sensor error is assumed.

The invention can provide error-tolerant determination of the motion values for a vehicle in the event of an IMU malfunction (operational failure) using 2-out-of-3 voting. In that case, there are no special requirements for geometric arrangement or sensor quality. However, the invention is also applicable to cost-effective, heterogeneous IMU hardware that is partially already available in the vehicle.

The method according to the invention makes it possible to protect the signals from the master inertial measurement unit against sensor errors as a way to guarantee the functionality (fail-operational) of estimating the correct movement of a vehicle in consideration of the increased safety requirements for automated vehicle operation.

The focus here is on the use of heterogeneous (not the same) inertial measurement units (IMUs) installed in particular at different places in the vehicle.

Error tolerance (fail-operational) when calculating vehicle movement values is achieved with the solution according to the invention. This only imposes low requirements on the structural elements. The available infrastructure of the vehicle (ESP sensors, undercarriage sensors) can be used for it, making it a cost-effective solution.

DESCRIPTION OF THE FIGURES

Examples of the invention are explained in more detail below, with reference to figures.

The figures show.

DETAILED DESCRIPTION

The same items are identified in all figures with the same designations.

In one method for detecting malfunctions in inertial measurement units that are used in a vehicle to measure angular velocities and specific forces, at least three inertial measurement units 4, 5, 6, each with multiple accelerometers and gyroscopic sensors are used as shown in FIG. 2.

According to the invention, a first inertial measurement unit 4 is used as the master inertial measurement unit, and a second inertial measurement unit 5 and a third inertial measurement unit 6, whose performance reliability can be lower than that of the first inertial measurement unit 4, are used as slave inertial measurement units, wherein messages from the master inertial measurement unit 4 are used in a detection unit 7 to estimate systematic error parameters in slave inertial measurement units 5, 6 relative to the master inertial measurement unit 4 in models, and to detect malfunctions in individual sensors through 2-out-of-3 voting on the compensated signals. In 2-out-of-3 voting, the two signals with the smallest difference are considered error-free and the third signal is tested against them. If the difference between the third signal and the signals considered error-free is too great, then a potential malfunction of the evaluated third signal is assumed.

In the diagrams, the three inertial measurement units 4, 5, 6 are also designated as IMU A, IMU B, IMU C. Each of them has a vector $\vec{\omega}_{ib}^{b}$ with three angular velocity signals and a vector $\vec{f}_{ib}^{b}$ with three specific force signals. For easier representation of these signals, the highest and deepest positions are not shown. We can then refer to the sensor signals as $\vec{\omega}_A$, $\vec{\omega}_B$, $\vec{\omega}_C$ or $\vec{f}_A$, $\vec{f}_B$, $\vec{f}_C$.

Figure 3:
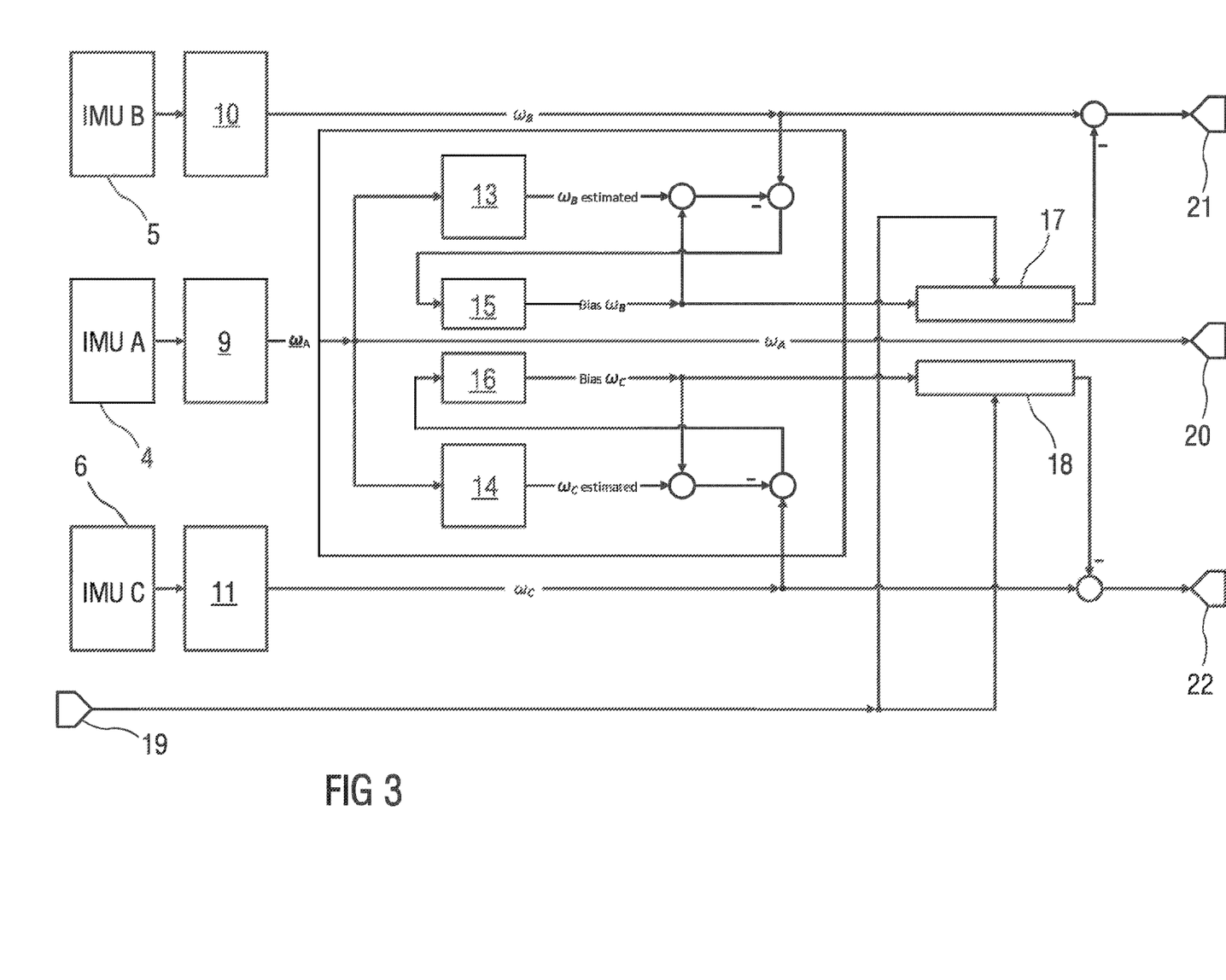
Figure 4:
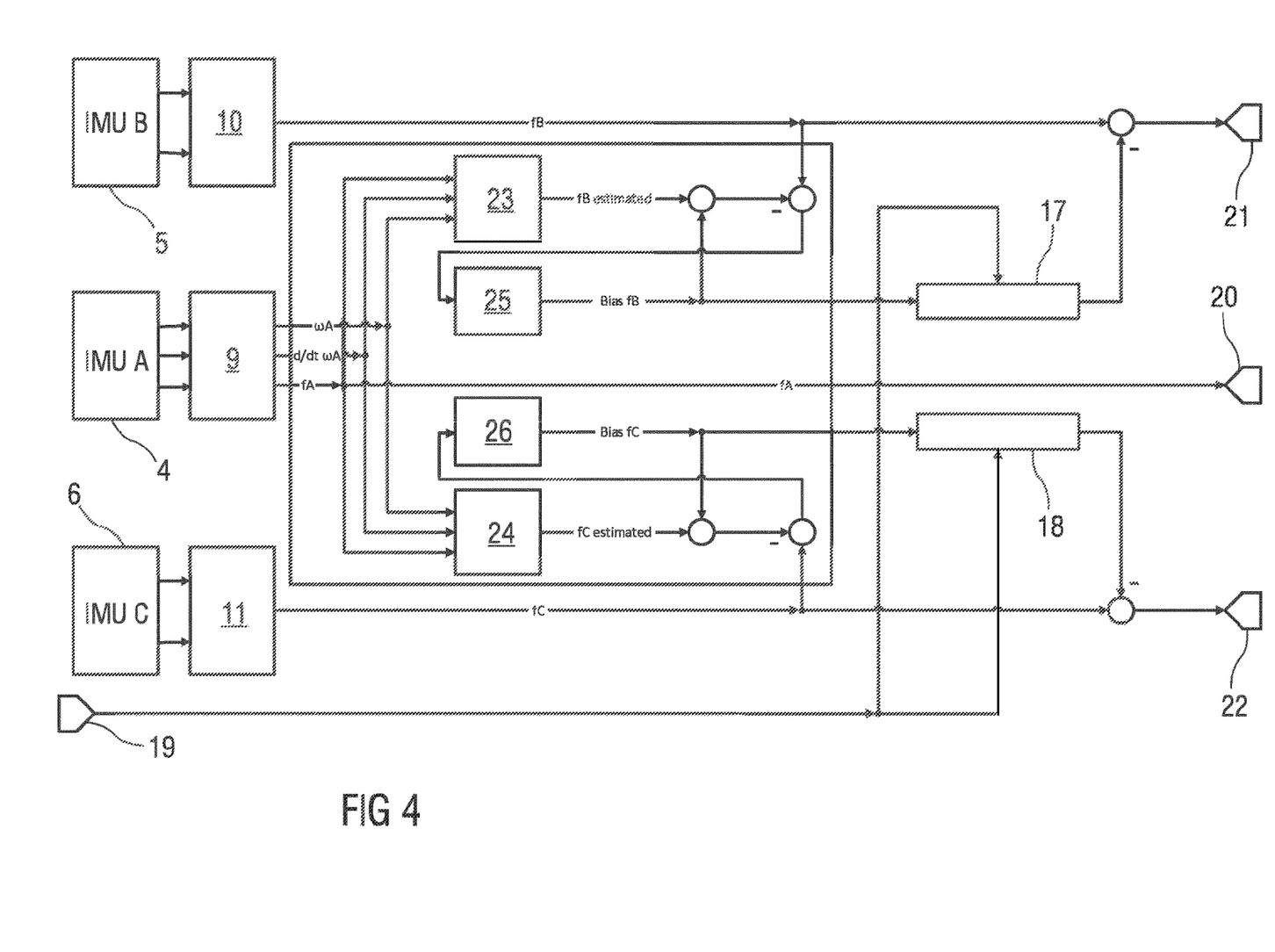
Figure 5:
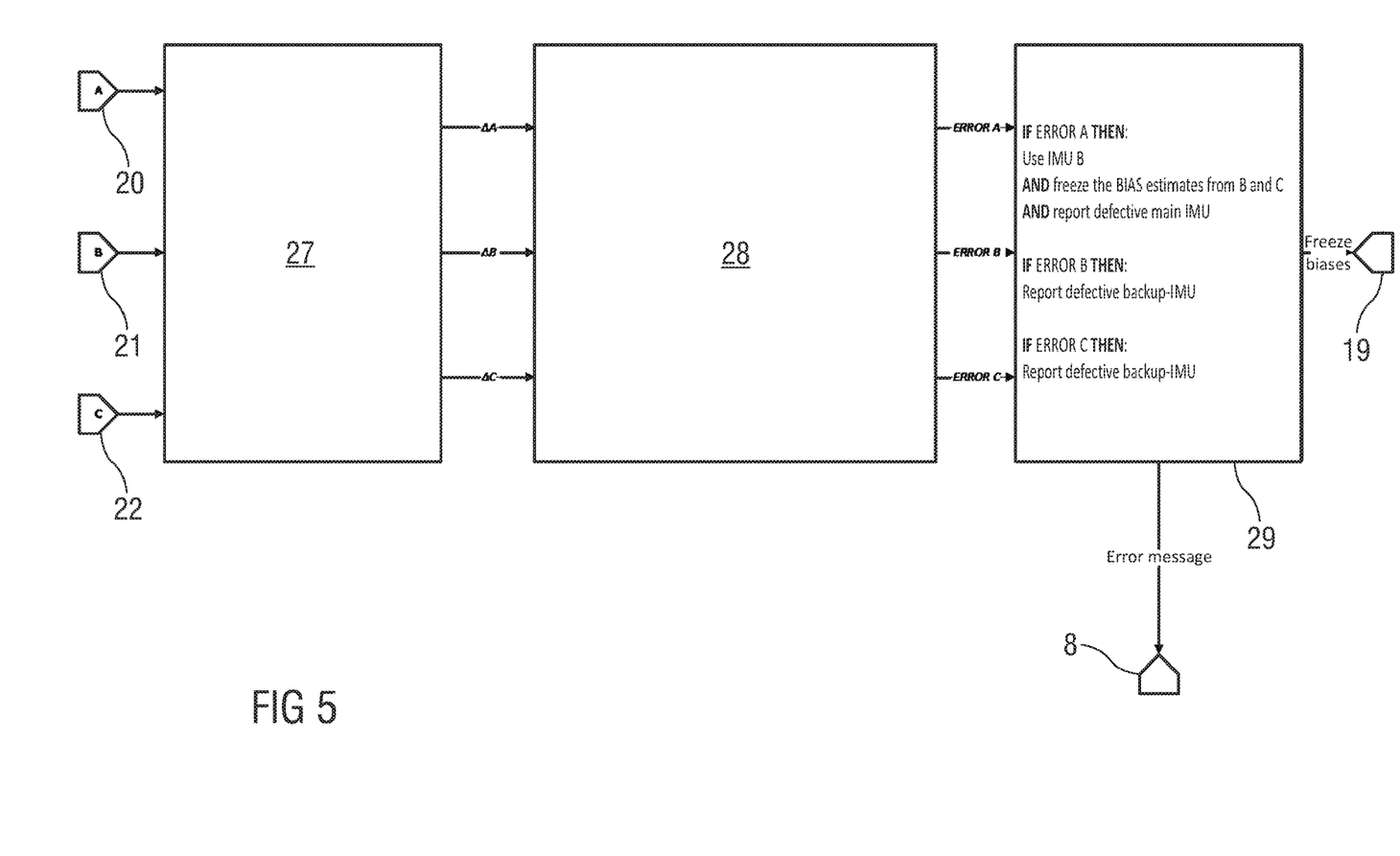

Details of the detection unit 7 are shown in FIGS. 3, 4, and 5.

FIG. 3 shows an example of pre-compensation of the rotation speed sensors. In it, filter units 9, 10, and 11 are provided, through which the sensor signals of the master inertial measurement unit 4 and the two slave inertial measurement units 5 and 6 are corrected, time-synchronized, and filtered in consideration of known misalignment.

Time synchronization is necessary, because in a heterogeneous arrangement of inertial measurement units, time synchronicity of the measurement values cannot be assumed. During signal transmission, for example, differences in communication latencies can occur or signal pre-filtering within the inertial measurement units 4, 5, 6 may be different.

After that, the parameters of the error models are determined for both slave inertial measurement units 5, 6 relative to the master inertial measurement unit 4. To do this, data from the master inertial measurement unit 4 concerning error models 13 and 14 are used to calculate target values or estimated sensor outputs $\omega_{Bestimated}$, $\omega_{Cestimated}$ for the behavior of the slave IMU signals. Each of the error models 13, 14 includes alignment of an individual rotation speed sensor with respect to the vector for the rotation speed $\omega_A$ of the master inertial measurement unit 4. This is determined, for example, during an end-of-line calibration. Deviations from target behaviors are then identified as sensor errors in the slave inertial measurement units 5, 6 and are corrected by estimation of parameters in the error model. In the embodiment shown in FIG. 3, the sensor biases Bias_$\omega_B$, Bias_$\omega_C$ are determined exclusively in estimator blocks 15 and 16. However, additional parameters can be estimated, e.g., bias drift, sensitivity deviations, and misalignment. As is known from the literature, the parameter estimation in estimator blocks 15 and 16 can be done using the recursive least squares method or Kalman filters. For normally functioning inertial measurement units 4, 5, 6, these estimated parameters change only very slowly over time and therefore remain valid over long periods of time. Therefore, the compensation of the slave inertial measurement units 5, 6 remains correct even if it is done with time-delayed error parameters. The corresponding time-delay blocks are designated as 17 and 18, where the delay time must be greater than the error detection time of the detection unit 7 and equal to 100 ms, for example.

The pre-processed signals 20 from the master inertial measurement unit 4 and the corrected signals 21, 22 from the two slave inertial measurement units 5 and 6 are then sent to the detection unit 7 for interpretation. If a malfunction occurs in the master inertial measurement unit 4, then the estimated parameters for the slave inertial measurement units 5, 6 change significantly. However, if this malfunction of the master inertial measurement unit 4 is recognized by the detection unit 7, then the time delay blocks 17 and 18 prevent the parameter changes from affecting detection. Instead, the incorrect parameters from the slave inertial measurement units 5, 6 are frozen at their respective last valid values. In this way, compensation and detection can be dissociated from each other and failures of the master inertial measurement unit 4 can reliably be differentiated from failures of the slave inertial measurement units 5, 6.

In addition to or in other embodiments of the invention, the estimated values of the parameters in the estimator blocks 15 and 16 can be limited to their maximum permissible values, which improves detection sensitivity.

In addition to or in other embodiments of the invention, the estimated parameters reaching or exceeding maximum permissible values can be used for error detection in the affected sensors.

In addition to or in other embodiments of the invention, the weighted remainders from pre-compensation can be calculated and evaluated in the estimator blocks 15, 16.

In addition to or in other embodiments of the invention, the calculated co-variances for estimation errors can be used in the estimator blocks 15 and 16 to weigh signal deviations during detection.

In FIG. 4, equivalent to the rotation speeds $\omega_A$, $\omega_B$, $\omega_C$ (also called angular velocities), the pre-compensation for the accelerometer signals (specific forces $f_A$, $f_B$, $f_C$) is shown. If the three inertial measurement units 4, 5, 6 are spatially spread apart on the vehicle, then, unlike the rotation speeds $\omega_A$, $\omega_B$, $\omega_C$, the location dependency of the specific forces $f_A$, $f_B$, $f_C$ must be taken into account. This is done when generating target values from the signals for the master inertial measurement unit 4 in error models 23 and 24, wherein the specific forces $f_A$, $f_B$, $f_C$ are transformed using the rotation speeds $\omega_A$, $\omega_B$, $\omega_C$ and rotation accelerations $d/dt\, \omega_A$, $d/dt\, \omega_B$, $d/dt\, \omega_C$ at a measurement location $\vec{r}_i$ of the respective slave inertial measurement unit 5, 6, using the following equation, known from the literature:

$$\vec{f}_i = \vec{f}_A + \dot{\vec{\omega}}_A \times \vec{r}_i + \vec{\omega}_A \times (\vec{\omega}_A \times \vec{r}_i) = \vec{f}_A + \dot{\Omega}_A \vec{r}_i + \Omega_A^2 \vec{r}_i \quad (3)$$

In this way, estimated sensor outputs $f_{B\_estimated}$, $f_{C\_estimated}$ are determined. In the embodiment shown in FIG. 4, the sensor biases $Bias\_f_B$, $Bias\_f_C$ are determined exclusively in estimator blocks 25 and 26. However, additional parameters can be estimated, e.g., bias drift, sensitivity deviations, and misalignment. As is known from the literature, parameter estimating in the estimator blocks 25 and 26 can be done with a recursive least squares method or a Kalman filter.

FIG. 5 shows an embodiment of error detection according to the 2-out-of-3 voting principle. The three individual signals for comparison and pre-processing from the master inertial measurement unit 20 and the two slave inertial measurement units 21 and 22 are designated as A, B, and C.

A, B, and C can respectively be a rotation speed $\omega_A$, $\omega_B$, $\omega_C$ or a specific force $f_A$, $f_B$, $f_C$. Overall, one detection is used for each degree of freedom of the inertial measurement units 4, 5, 6.

In addition, the median values M and D for the signals and their deviations are calculated in a block 27. Alternatively (and for three signals equivalent hereto), instead of the median value M, D, the average of the two signals with the least distance between them can be used.

The difference between each individual signal and the median value M, D is then calculated and normalized against a threshold value S. As the threshold value S, a combination of the variance σ of the signal-noise process and a component T is used, which represents the time synchronization uncertainty.

$$M = \text{median}\,(A, B, C) \quad (4)$$

$$D = \text{median}\,(\dot{A}, \dot{B}, \dot{C}) \quad (5)$$

$$S = 3\sigma + |D|T \quad (6)$$

$$\Delta A = \frac{A - M}{S} \quad (7)$$

$$\Delta B = \frac{B - M}{S} \quad (8)$$

$$\Delta C = \frac{C - M}{S} \quad (9)$$

As explained above, the standard deviations for the estimation errors from the estimator blocks 15, 16, 25, and 26 can also be used in generating the threshold value.

A detection logic 28 tests whether the normalized signal difference ΔA, ΔB, ΔC from the median M, D exceeds the value 1. If it does, then a malfunction ERROR A, ERROR B, ERROR C is assumed for the sensor signal in question.

IF |ΔA|>1 THEN ERROR A

IF |ΔB|>1 THEN ERROR B

IF |ΔC|>1 THEN ERROR C

The appearance of a malfunction ERROR A, ERROR B, ERROR C in the master inertial measurement unit 4 is communicated by a decision-making logic 29 via an error message to a switching device 8, which then switches to one of the slave inertial measurement units 5, 6. In the embodiment shown in FIG. 5, this is the slave inertial measurement unit 5.

Because the error model parameters for the affected slave inertial measurement unit 5 were determined based on the master inertial measurement unit 4, the slave inertial measurement unit 5 is processed using bias, drift, sensitivity, etc. identical to the master inertial measurement unit 4, and subsequent movement calculations can be done without consideration of the switching process.

As already described above, the parameter estimation for the slave inertial measurement units 5, 6 must be dissociated in the event of a malfunction in the master inertial measurement unit 4. This is done by means of a signal 19.

If a malfunction ERROR B, ERROR C is detected in one of the slave inertial measurement units 5, 6, it is reported as defective.

It is desirable to find the optimal compromise between sensitivity to sensor errors and resistance to false positive detection due to signal noise, road damage effects, and other uncertainties.

Citations Included in the Description

Cited Patent Literature

U.S. Pat. No. 9,568,321 B2
Systems and Methods for Determining Inertial Navigation System Faults
Bharadwaj et al. February 2017

U.S. Pat. No. 8,065,074 B1
Configurable Inertial Navigation System with Dual Extended Kalman Filter Modes
Licardo, November 2011
U.S. Pat. No. 5,184,304 A
Fault-Tolerant Inertial Navigation System
Huddle February 1993
U.S. Pat. No. 8,825,436 B2
Inertial Sensing with Spatially Distributed Sensor Array and Two-Dimensional Data Processing
Zhang et al. September 2014
U.S. Pat. No. 9,753,144 B1
Bias and Misalignment Compensation for 6-DOF IMU Using GNSS/INS Data
Jafari et al. May 2017

OTHER PUBLICATIONS

1. M. L. Sheffels, "A Fault-Tolerant Air Data/Inertial Reference Unit", IEEE AES Systems Magazine, 8840 Evergreen Blvd, MN51-1355, Minneapolis, MN 5543, 1993; M. D. McIntyre and C. A. Gossett, "The Boeing 777 Fault Tolerant Air Data Inertial Reference System—A New Venture In Working Together", Seattle, WA 98124: Boeing Commercial Airplane Group, 1995
2. Jan Wendel, Integrierte Navigationssysteme [Integrated Navigation Systems], Oldenbourg 2007
3. Paul D. Groves, "Principles of GNSS, Inertial and Multisensor Integrated Navigation Systems", Artech House, Boston, London 2013
4. Willy Klier, Andreas Reim and Dietmar Stapel, Sae Technical Paper Series, No. 2008-01-0582, "Robust Estimation of Vehicle Sideslip Angle an Approach w/o Vehicle and Tire Models", Apr. 14-17, 2008, (7 pages).
5. Andreas Reim, Alexander Steinbach, Oliver Oettgen and Dietmar Stapel, 2009 SAE International, No. 2009-01-0430, "Central Sideslip Angle Estimation on a Software Integration Platform," 2009, (5 pages).
6. http://www.aceinna.com
Triple redundant IMU targets autonomous vehicles, September 2019

LIST OF REFERENCE INDICATORS

1 Inertial measurement unit
2 Sensor fusion unit
3 Other sensors
4 Inertial measurement unit, IMU, Master inertial measurement unit, Master IMU
5 Inertial measurement unit, IMU, Slave inertial measurement unit, Slave IMU
6 Inertial measurement unit, IMU, Slave inertial measurement unit, Slave IMU
7 Detection unit
8 Switching device
9 Filter unit
10 Filter unit
11 Filter unit
13 Error model
14 Error model
15 Estimator block
16 Estimator block
17 Time delay block
18 Time delay block
19 Signal
20 Pre-processed signals
21 Corrected signals
22 Corrected signals
23 Error model
24 Error model
25 Estimator block
26 Estimator block
27 Block
28 Detection logic
29 Decision-making logic
A, B, C Pre-processed individual signals
Bias_fB, Bias_fC Sensor bias
Bias_$\omega$B, Bias_$\omega$C Sensor bias
D Median value, median
ERROR A, ERROR B, ERROR C Malfunction
d/dt $\omega$A Rotation acceleration
fA, fB, fC Specific Force
fB_estimated, fC_estimated Estimated sensor output
IMU A Inertial measurement unit, Master inertial measurement unit
IMU B Inertial measurement unit, Slave inertial measurement unit
IMU C Inertial measurement unit, Slave inertial measurement unit
M Median value, median
P Position
S Threshold value
T Component
v Velocity
$\alpha$ Position angle
$\Delta$A, $\Delta$B, $\Delta$C Normalized signal difference
$\sigma$ Variance
$\omega$A, $\omega$B, $\omega$C Rotation speed, angular velocity
$\omega$B-estimated, $\omega$C-estimated Target value

What is claimed is:

1. A method for detecting malfunctions in inertial measurement units that are being used on a vehicle with automated driving capabilities to measure angular velocities and specific forces, involving at least three inertial measurement units, each with multiple sensors, including accelerometers and gyroscopic sensors, comprising:

a first inertial measurement unit is used as a master inertial measurement unit, and a second inertial measurement unit and a third inertial measurement unit, whose performance reliability is lower than that of the first inertial measurement unit, are used as slave inertial measurement units, wherein measurements from the master inertial measurement unit are used as reference values in order to compensate for measurements from the slave inertial measurement units via estimation of error model parameters and compared to the master inertial measurement unit, so that, based on a sensor signal from each of the first inertial measurement unit, the second inertial measurement unit, and the third inertial measurement unit, and using 2-out-of-3 voting, a malfunction is detected in one of the three sensor signals, wherein one of the three inertial measurement units whose sensor signal has a distance from a median for the three sensor signals that exceeds a threshold value is identified as defective, and a malfunction of the master inertial measurement unit causes the signals to be switched to one of the still functional slave inertial measurement units, applying previously calculated precompensation, wherein time delays are applied to estimated sensor outputs, wherein upon detection of an error in the first inertial measurement unit within the time delay, the estimated sensor errors in the slave inertial measurement units are frozen at the values for the end of the time delay, and wherein upon detection of an error in one of the first inertial measurement unit, the second inertial measurement unit, or the third inertial measurement unit, the error is eliminated and a backup solution is triggered.

2. The method as in claim 1, wherein the error model parameters are estimated using a Kalman filter or a recursive least squares method.

3. The method as in claim 2, wherein co-variances of estimation errors evaluated in the Kalman filters are used in assessing sensor signal deviations when detecting a significance of signal deviations.

4. The method as in claim 1, wherein for estimation of the error model parameters, error models are used that involve all model parameters from the slave inertial measurement units, wherein at least temporally different relative sensor offsets from the master inertial measurement unit are estimated online.

5. The method as in claim 1, wherein specific forces from the master inertial measurement unit are translated to the slave inertial measurement units.

6. The method as in claim 1, wherein the estimated parameters are limited to permissible maximum values.

7. The method as in claim 1, wherein all sensors in all inertial measurement units are filtered and time-synchronized using respective filter units.

8. The method as in claim 1, wherein online-estimated error model parameters are time-delayed and applied to measurement values of the slave inertial measurement units.

9. The method as in claim 1, wherein the slave inertial measurement units are pre-compensated using a master-slave configuration.

10. The method as in claim 1, wherein detection logic is applied to the signals from the first inertial measurement unit and the pre-compensated signals from the slave inertial measurement units, in order to detect a signal that deviates the most from an average or the median of the three signals, wherein if a normalized signal difference from average or median exceeds the value 1, a sensor error is assumed.

* * * * *